(12) United States Patent
Sharpley et al.

(10) Patent No.: US 8,733,963 B2
(45) Date of Patent: May 27, 2014

(54) PORTABLE SOLAR LIGHT TOWER

(76) Inventors: Bryan P. Sharpley, Santa Rosa, CA (US); Kirsten A. Waldorf, Santa Rosa, CA (US)

( * ) Notice: Subject to any disclaimer, the term of this patent is extended or adjusted under 35 U.S.C. 154(b) by 325 days.

(21) Appl. No.: 12/719,409

(22) Filed: Mar. 8, 2010

(65) Prior Publication Data
US 2010/0232148 A1 Sep. 16, 2010

Related U.S. Application Data

(60) Provisional application No. 61/159,699, filed on Mar. 12, 2009.

(51) Int. Cl.
*F21L 13/00* (2006.01)

(52) U.S. Cl.
USPC .......................................... 362/183; 362/485

(58) Field of Classification Search
USPC ......... 362/183, 192, 431, 157, 190, 485, 403, 362/414
See application file for complete search history.

(56) References Cited

U.S. PATENT DOCUMENTS

| | | | | |
|---|---|---|---|---|
| 4,220,981 | A * | 9/1980 | Koether | 362/486 |
| 4,421,943 | A * | 12/1983 | Withjack | 136/246 |
| 4,481,562 | A * | 11/1984 | Hickson | 362/183 |
| 5,155,606 | A * | 10/1992 | Landesman | 359/29 |
| 5,522,943 | A * | 6/1996 | Spencer et al. | 136/245 |
| 5,524,398 | A * | 6/1996 | Miller et al. | 52/121 |
| 5,611,177 | A * | 3/1997 | Herbstritt | 52/111 |
| 5,618,680 | A * | 4/1997 | Miron et al. | 435/7.21 |
| 5,808,450 | A * | 9/1998 | Chula et al. | 322/22 |
| 5,905,356 | A * | 5/1999 | Wells | 320/101 |
| 5,969,501 | A | 10/1999 | Glidden et al. | |
| 6,201,181 | B1 * | 3/2001 | Azzam et al. | 136/244 |
| 6,396,239 | B1 * | 5/2002 | Benn et al. | 320/101 |
| 6,476,311 | B1 * | 11/2002 | Lee et al. | 136/244 |
| 6,799,742 | B2 * | 10/2004 | Nakamura et al. | 244/172.7 |
| 7,089,705 | B1 * | 8/2006 | Lieberman | 52/146 |
| 7,135,990 | B2 | 11/2006 | Richardson et al. | |
| 2005/0068765 | A1 * | 3/2005 | Ertze et al. | 362/183 |
| 2005/0161079 | A1 * | 7/2005 | Gray | 136/291 |
| 2008/0053510 | A1 * | 3/2008 | Lin et al. | 136/243 |
| 2008/0210289 | A1 * | 9/2008 | Chen | 136/244 |
| 2008/0298051 | A1 * | 12/2008 | Chu | 362/183 |
| 2009/0007958 | A1 * | 1/2009 | Ho et al. | 136/245 |
| 2009/0231838 | A1 * | 9/2009 | Kim | 362/158 |
| 2009/0266352 | A1 * | 10/2009 | Wetmore | 126/571 |
| 2011/0005573 | A1 * | 1/2011 | Chang et al. | 136/245 |
| 2012/0291847 | A1 * | 11/2012 | Rowe et al. | 136/245 |

* cited by examiner

*Primary Examiner* — Julie Bannan
(74) *Attorney, Agent, or Firm* — Haverstock & Owens LLP

(57) ABSTRACT

A portable solar light tower includes a trailer mounted extension tower outfitted with high output Light Emitting Diode (LED) flood lights. The portable solar light tower also includes a set of solar panels which fold up for travel mode and fold down for charging mode. A battery bank is housed in a locking compartment built into the trailer deck.

27 Claims, 9 Drawing Sheets

PORTABLE SOLAR LIGHT TOWER

CROSS-REFERENCE TO RELATED APPLICATION(S)

This application claims priority under 35 U.S.C. 119(e) of the U.S. Provisional Patent Application Ser. No. 61/159,699, filed Mar. 12, 2009 and entitled, "PORTABLE SOLAR LIGHT TOWER," which is hereby incorporated by reference in its entirety for all purposes.

FIELD OF THE INVENTION

The present invention relates to the field of lighting systems and devices. More specifically, the present invention relates to the field of portable lighting systems and devices that use solar power.

BACKGROUND OF THE INVENTION

Road construction is preferably done at night when traffic is low, and the affect on drivers and traffic is minimized. Other construction is performed during the night as well. However, at night, large lights or at least powerful lights are used to illuminate the work area so that the workers are able to see. These large lights are high wattage lights which run using a diesel powered generator. With the volatility of oil prices, diesel is, at times, very expensive, causing the cost of using the lights to increase substantially.

SUMMARY OF THE INVENTION

A portable solar light tower includes a trailer mounted extension tower outfitted with high output Light Emitting Diode (LED) flood lights. The solar light tower also includes a set of solar panels which fold up for travel mode and fold down for charging mode. A battery bank is housed in a locking compartment built into the trailer deck. The tower is able to be raised and lowered. In operation, the solar panels charge the batteries which then power the lights at night providing a portable, no emission and no noise, light source.

In one aspect, a solar power device comprises a portable base, a solar panel coupled to the portable base for converting solar energy into electricity and a light coupled to the portable base for illuminating an area using the electricity from the solar panel. The device further comprises a protective back plate for protecting the solar panel. The device further comprises a battery for storing the electricity and providing the electricity to the light. The device further comprises a control panel for controlling the light and the solar panel. The device further comprises a pivotable, telescoping tower coupling the light to the portable base, wherein the telescoping tower is extendable and pivotable between a down position to an up position. The device further comprises a winch and pulley system for moving the telescoping tower between the down position to the up position. The device further comprises anti-slam shock absorbers coupled to the portable base for preventing the solar panel from slamming open. The portable base is a trailer. The solar panel is rotatable to an open position to acquire the solar energy and a closed position to protect the solar panel. The light is selected from the group consisting of one or more floodlights and one or more light emitting diode floodlights.

In another aspect, a solar powered battery operated portable light tower, comprises a frame, a first enclosure supported by the frame, the enclosure including one or more batteries, a second enclosure containing controls, an extension tower including a set of light emitting diode floodlights, a cable winch and pulley system to extend and contract the tower and one or more solar panels mounted on pivotal brackets each with a protective back plate and anti-slam shock absorbers. The controls comprise a control panel for controlling the set of light emitting diode floodlights and the one or more solar panel. The tower comprises a pivotable, telescoping tower coupling the floodlights to the frame, wherein the telescoping tower is extendable and pivotable between a down position to an up position. The frame is a trailer. The solar panel is rotatable to an open position to acquire the solar energy and a closed position to protect the solar panel.

In another aspect, a method of utilizing a portable solar light tower comprises configuring a portable solar light tower in a transport mode, transporting the portable solar light tower, configuring the portable solar light tower in a charge mode, charging a battery using a solar panel of the portable solar light tower, configuring the portable solar light tower in a light mode and lighting an area. Configuring the portable solar light tower in the transport mode includes placing a tower in a down position and placing the solar panel in a protected position with a back plate protecting the solar panel. Transporting includes trailing the portable solar light tower. Configuring the portable solar light tower in the charge mode includes placing the solar panel in a position to receive sunlight. Configuring the portable solar light tower in the light mode includes raising a tower into a substantially upright position.

In another aspect, a system for illuminating an area at night using a renewable energy source comprises an energy acquisition component acquiring energy from the renewable energy resource, a protective component for protecting the energy acquisition component, a lighting component for illuminating the area and a raising component for raising the lighting component. The system further comprises a transporting component for transporting the system. The transporting component is a trailer. The system further comprises a battery for storing the electricity and providing the electricity to the light. The system further comprises a control component for controlling the lighting component and the energy acquisition component. The raising component comprises a pivotable, telescoping tower coupling the lighting component to the transporting component, wherein the telescoping tower is extendable and pivotable between a down position to an up position. The raising component comprises a winch and pulley system for moving the telescoping tower between the down position to the up position. The protective component further comprises anti-slam shock absorbers for preventing the energy acquisition component from slamming open. The energy acquisition component is rotatable to an open position to acquire solar energy and a closed position to protect the energy acquisition component. The light is selected from the group consisting of one or more floodlights and one or more light emitting diode floodlights.

DETAILED DESCRIPTION OF THE PREFERRED EMBODIMENT

A portable solar light tower utilizes solar power to charge one or more batteries and then uses the batteries to power a set of lights.

Figure 1:
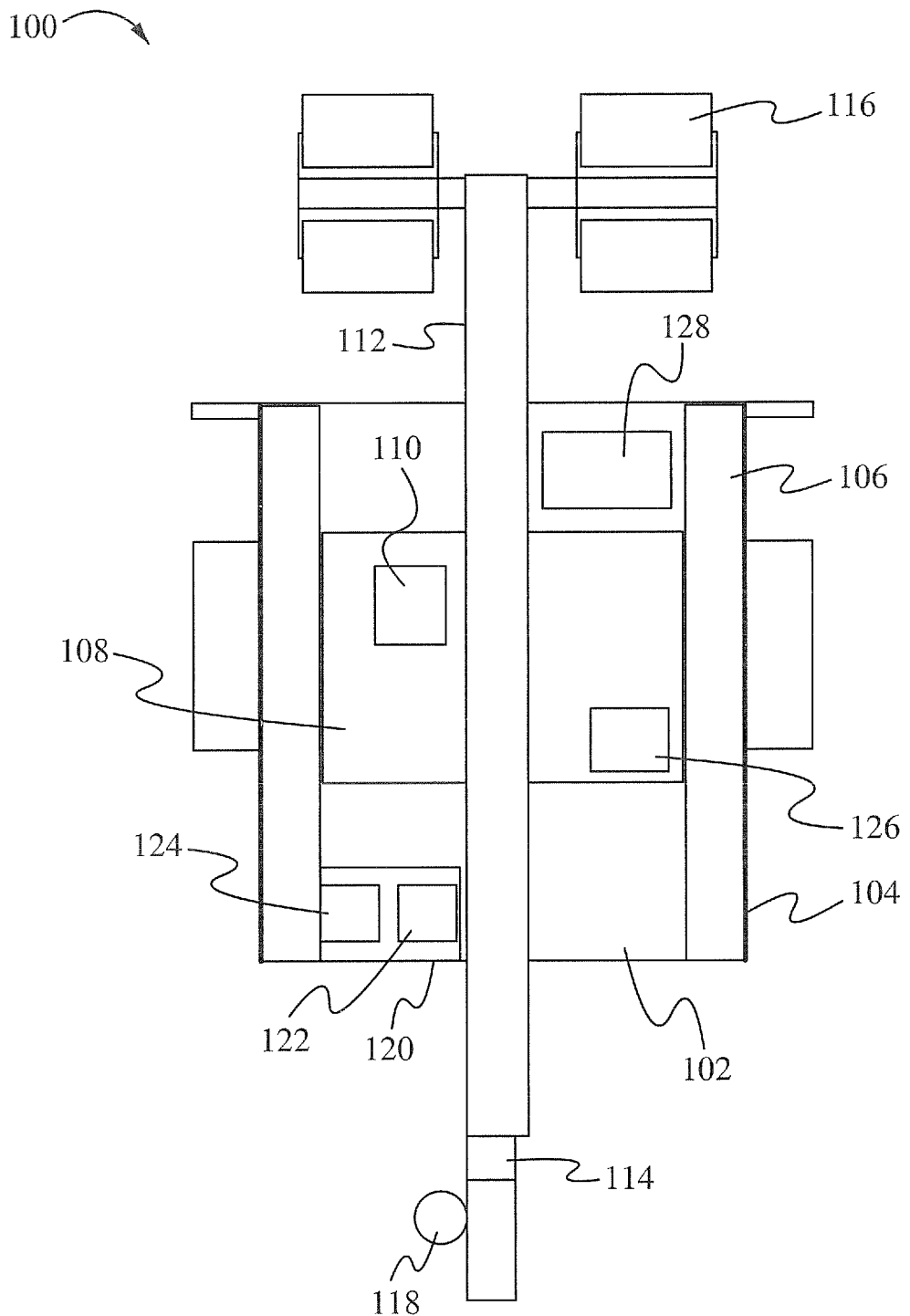
FIG. 1 illustrates a top view of a portable solar light tower in a travel mode in accordance with some embodiments.

FIG. 1 illustrates a top view of a portable solar light tower 100 in a travel mode in accordance with some embodiments. The portable solar light tower 100 includes several components such as a frame 102, backplates 104, one or more solar modules 106, a battery enclosure/box 108, one or more batteries 110, a tower 112, a tower base pivot point 114, one or more lights 116, a trailer jack 118, a control enclosure 120, controls 122, a charge controller 124, jumper cables 126 and a generator 128. In the travel mode, the tower 112 is positioned in a lowered position so that the tower 112 and lights 116 do not hit objects. Additionally, in travel mode, the solar modules 106 and the backplates 104 are positioned in a closed position so that the solar modules 106 face inward and are protected with the backplates 104 facing outward.

The frame 102 is able to be any shape, size or configuration to meet any or all of the desired goals of the portable solar light tower 100. In some embodiments, the frame 102 includes a floor and other standard frame components of a trailer such as wheels, an axle and support members for the trailer. In some embodiments, the frame 102 is also referred to as a trailer. The frame 102 is configured to couple to the backplates 104. In some embodiments, the frame is a Diamond Plate base with a built-in battery compartment. In some embodiments, where the frame 102 is not configured as a trailer, the frame 102 is able to include fewer or more components such as no wheels. In some embodiments, the frame includes a support 160 (FIG. 6) to support the extension tower 112 and the lights 116. The support 160 (FIG. 6) is configured to receive the extension tower 112. The frame 102 is able to be constructed out of any material such as stainless steel, other metals, plastic, wood, rubber, other materials or any combination thereof.

The backplates 104 are configured to couple to the frame 102. The backplates 104 are also configured to be able to move/rotate between an open configuration and a closed configuration. The backplates 104 are configured to move/rotate between an open and closed configuration using an automated system or manually. In the closed configuration, the backplates 104 protect the solar modules 106 from objects such as debris, rocks and other potentially harmful items that could damage the solar modules 106. In some embodiments, the backplates 104 include a locking device to ensure the backplates 104 maintain the desired position. The backplates 104 are able to be constructed out of any material such as stainless steel, other metals, plastic, wood, rubber, other materials or any combination thereof. In some embodiments, the backplates 104 are part of the solar modules 106 and are back plates of the solar modules 106.

The solar modules 106 are positioned on the opposite side of the backplates 104 so that when the backplates 104 are in a closed configuration, the solar modules 106 are protected. The solar modules 106 are able to be any type of solar module/panel. Any number of solar modules 106 are able to be used from one to many. In some embodiments, two Mitsubishi 125W lead-free panels are used. The solar modules 106 are coupled to the batteries 110. In some embodiments, each solar module 106 is a photovoltaic module mounted to the trailer base via a pivoting bracket allowing the panels to fold out over the trailer fenders for charging and fold up to a vertical (or closed) position for transport. This mounting method also allows for the use of a wide range of solar panels for trailer scalability and versatility. In some embodiments, shock absorbers 136 (FIG. 2) run from the trailer base to the back side of the solar panel mounts to prevent the panels from slamming down when folding out into the charge mode.

The battery box 108 is an enclosure to store the batteries 110. The battery box 108 is able to be located anywhere on or within the frame. In some embodiments, the battery box 108 is positioned under the frame, and in some embodiments, the battery box 108 is positioned on top of the frame. In some embodiments, the battery box 108 is positioned elsewhere. The battery box 108 is able to be a minimal, partial or full enclosure for the batteries 110.

The batteries 110 are stored within the battery box 108. The number of batteries 110 is able to range from one to many. The batteries 110 are able to be any type of battery. In some embodiments, the batteries are sealed, maintenance-free batteries or battery banks. In some embodiments, four MK Gel Sealed maintenance-free 98ah batteries are used. In some embodiments, a charge controller 124 is included as well, such as a Xantrex C-30 controller.

Figure 2:
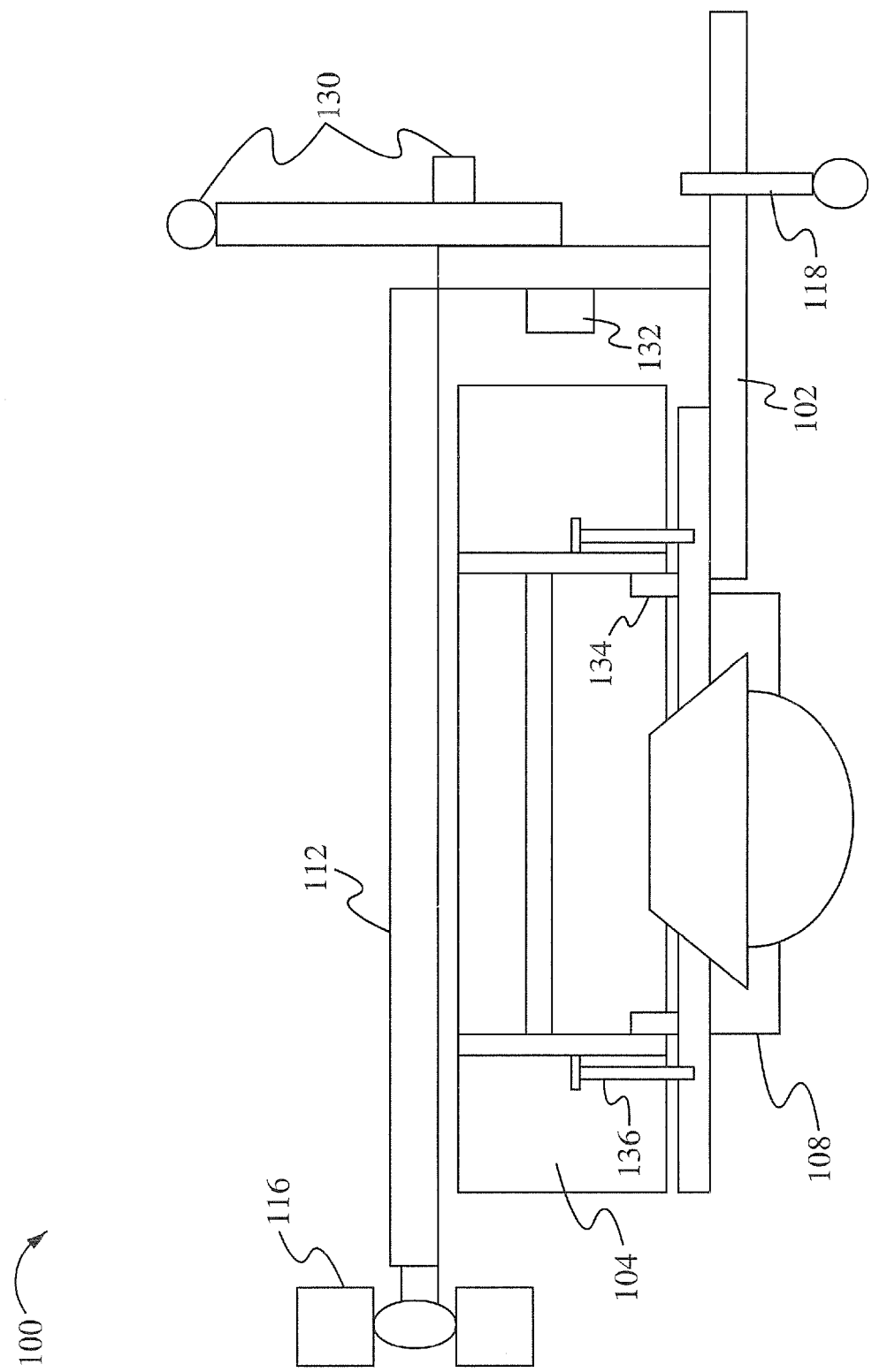
FIG. 2 illustrates a side view of a portable solar light tower in a travel mode in accordance with some embodiments.

The extension tower 112 is coupled to the frame 102. In some embodiments, the extension tower 112 is coupled to the frame at a pivoting bracket 114 which allows the tower 112 to fold down for travel mode and be erected at various heights for the lighting mode. In some embodiments, the extension tower 112 includes telescoping capabilities. In some embodiments, a gear-driven cable winch and pulley system 130 (FIG. 2) is able to be used to raise and lower the extension tower 112. The gear-driven cable winch and pulley system 130 (FIG. 2) is able to be operated by a hand crank or a small motor (such as an electric motor). In some embodiments, the extension tower 112 is pre-loaded with a spring which goes from the trailer base to the extension tower 112 in order to keep tension on the winch/pulley system 130 (FIG. 2). A cable routed internally through the extension tower 112 coupled to the base of the extension portion of the extension tower 112, a pulley at the pivot point 114 of the tower 112 and return spring are used to prevent tower 112 over-extension. In some embodiments, the extension tower 112 is able to move from a travel mode to a lighting mode by other means such as telescoping up and down, or other implementations. The extension tower 112 is able to be constructed out of any material such as stainless steel, other metals, plastic, wood, rubber, other materials or any combination thereof. Coupled to the tower 112 are lights 116.

The lights 116 are coupled to the extension tower 112. The lights are able to be any kind of lights such as floodlights, Light Emitting Diode (LED) floodlights or others. In some embodiments, the LED floodlights include 600 LEDs, require 36 W of power and produce cool white light. The lights 116 are able to be mounted or coupled to the extension tower 112 in any manner. In some embodiments, a U-bracket is used to be able to adjust aiming and mounting. Thus, in some embodiments, the height and the angle of the lights 116 on the extension tower 112 is able to be adjusted. The light fixture containing the lights 116 is able to be constructed of any appropriate material. In some embodiments, the light fixture is constructed of cast aluminum with an impact resistant lens. In some embodiments, the lights 116 provide a color other than white light.

The trailer jack 118 allows the frame 102 to be coupled to a trailer hitch such as on a car/truck. By using a trailer configuration, the design is simplified and standard cars/trucks with trailer hitches are able to transport the portable solar light tower 100.

In some embodiments, a control enclosure 120 contains a control system 122. The control enclosure 120 and control system 122 are able to be located anywhere in the portable solar light tower 100. Easy access to the control system 122 is beneficial. The control system 122 is able to control any or all of the components within the portable solar light tower 100 depending on the embodiment. For example, the control system 122 is able to control to moving/rotating of the solar modules 106 between a closed and an open configuration (also referred to as a transport mode and a charge mode). In some embodiments, the control system 122 is also able to control raising and lower of the extension tower 112 and other components. In some embodiments, the control system 122 includes a dimmer switch to control the amount of light and extend battery use. The control system 122 is able to be any type of implementation such as buttons, levers and/or a computer system. In some embodiments, the control system 122 is waterproofed or protected against water in some manner. In some embodiments, the control enclosure 120 includes a charge controller 124. The charge controller 124 ensures proper functionality between the solar modules 106 and the batteries 108. In some embodiments, the charge controller 124 is located elsewhere. In some embodiments, the control system 122 includes switchgear, possibly a Low Voltage Directive (LVD) switchgear.

In some embodiments, a hardwired set of jumper cables 126 are built into the battery compartment for emergency charging in the event of an LVD situation during operation. The batteries 110 are able to be easily quick-charged from a vehicle and/or be used to jumpstart a vehicle in a reverse scenario using the jumper cables 126.

In some embodiments, a generator 128 is included. The generator 128 is able to be used in the event of an LVD situation or to run additional tools or provide power for other purposes. In some embodiments, the generator 128 is a Honda whisper silent generator or another very quiet generator.

FIG. 2 illustrates a side view of a portable solar light tower 100 in a travel mode in accordance with some embodiments. In addition to the components and structure described above, the portable solar light tower 100 includes other components, in some embodiments. As described briefly above, the winch/pulley system 130 is able to be used to raise and lower the extension tower 112. The gear-driven cable winch and pulley system 130 is able to be operated by a hand crank, a motor (e.g. electric) or some other device. In some embodiments, the extension tower 112 is pre-loaded with a spring which goes from the trailer base to the tower 112 in order to keep tension on the winch/pulley system 130. Other implementations instead of the winch/pulley system 130 or variations of the winch/pulley system 130 are also able to be used. Using a cable routed internally through the extension tower 112 coupled to the base of the extension portion of the tower, a pulley at the pivot point 114 of the tower and a return spring 132 are used to prevent tower overextension. To enable the solar modules 106 to move/rotate/pivot and be mounted to the frame 102, a solar panel pivot point/mounting bracket 134 is used. Other pivot/mounting implementations are able to be used. As described briefly above, one or more shock absorbers 136 are able to be used to prevent the solar modules 106 from slamming down when folding out into the charge mode.

Figure 3:
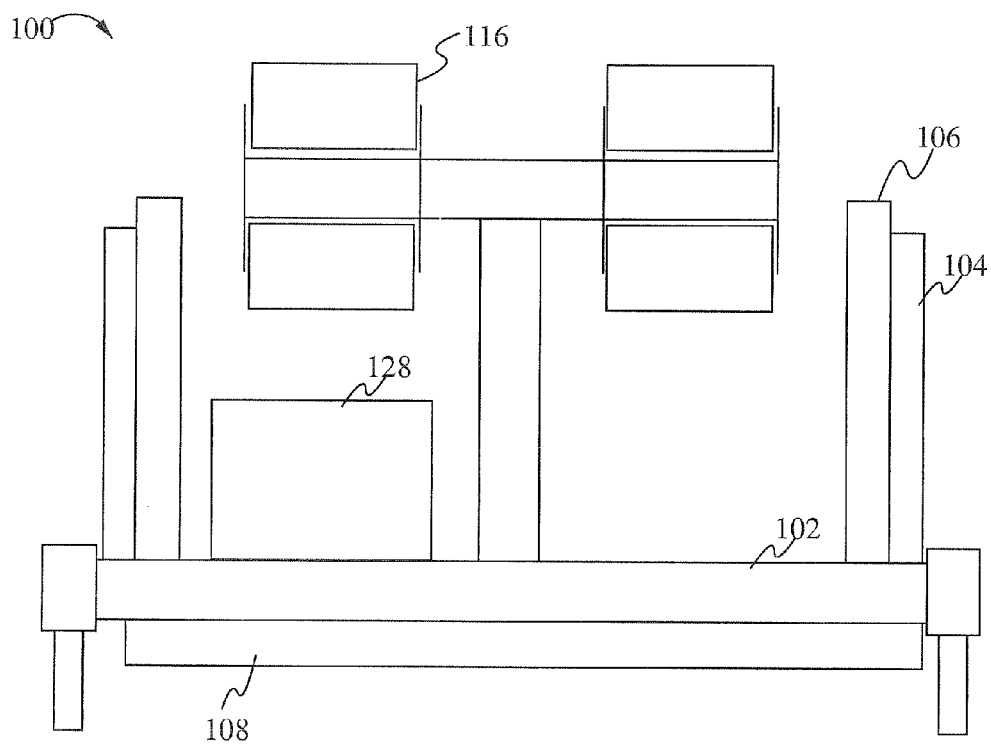
FIG. 3 illustrates a rear view of a portable solar light tower in a travel mode in accordance with some embodiments.

FIG. 3 illustrates a rear view of a portable solar light tower 100 in a travel mode in accordance with some embodiments. The rear view shows the lights 116 in a down position, the solar modules 106 in a closed position which is upright with the backplate 104 on the outside protecting the solar module 106. The rear view also shows the battery compartment 108 below the frame 102.

Figure 4:
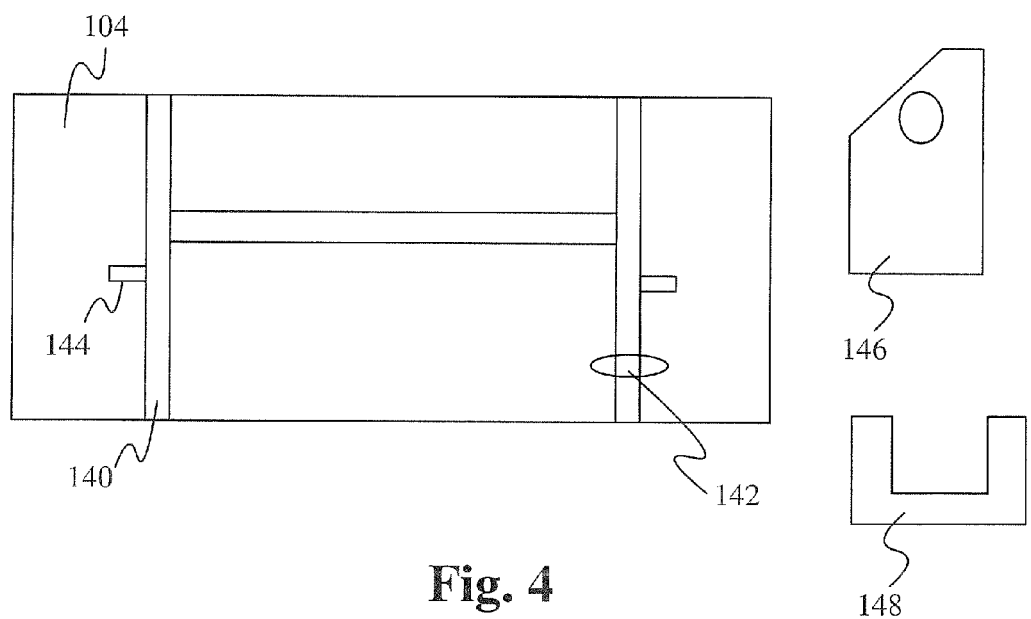
FIG. 4 illustrates a top view of a solar panel backplate in accordance with some embodiments.

FIG. 4 illustrates a top view of a solar panel backplate 104 in accordance with some embodiments. The backplate 104 protects the fragile rear side of the solar module 106 (FIG. 1). In some embodiments, the backplate 104 is welded to a tubular steel framework 140 which couples to the trailer base via a pivotal shaft at a pivot point 142 enabling the solar modules 106 (FIG. 1) to fold out over the fenders of the trailer for charge mode and fold up to a vertical position for travel mode. Shock absorbers 136 (FIG. 2) are coupled to the steel framework of the panel mounts at a shock absorber mount 144 and to the trailer frame 102 (FIG. 1) to prevent the panels from slamming down when folding out for charge mode. A trailer mount bracket 146 and a trailer side shock absorber mount 148 are also shown.

Figure 5:
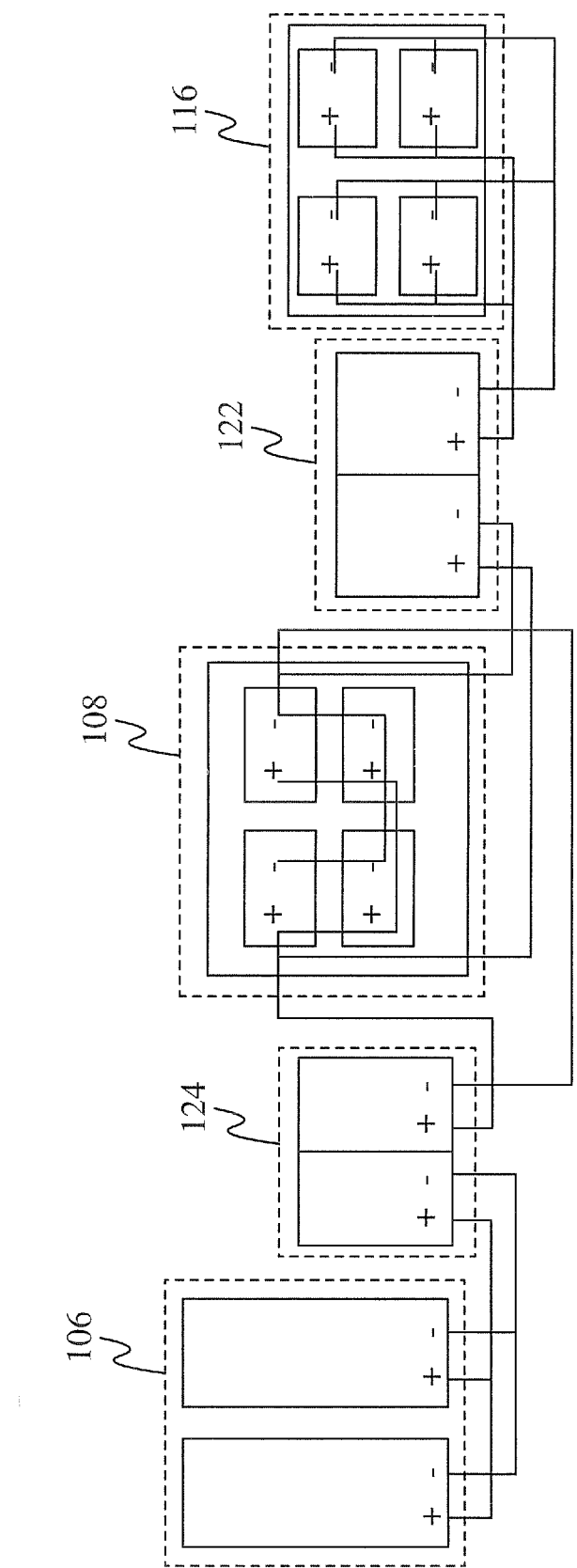
FIG. 5 illustrates an exemplary wiring diagram for the portable solar light tower in accordance with some embodiments.

FIG. 5 illustrates an exemplary wiring diagram for the portable solar light tower in accordance with some embodiments. The solar modules 106 (FIG. 1) are coupled to an input of a charge controller 124 (FIG. 1), and an output of the charge controller 124 (FIG. 1) is coupled to a battery bank 108 (FIG. 1) for storing the power generated by the solar modules 106 (FIG. 1). The battery bank 108 (FIG. 1) is then coupled to an input of switch gear & LVD 122 (FIG. 1), and an output of the switch gear & LVD 122 (FIG. 1) is coupled to the lights 116 (FIG. 1). Other wiring schemes are possible. Further, more or fewer components are able to be included.

Figure 6:
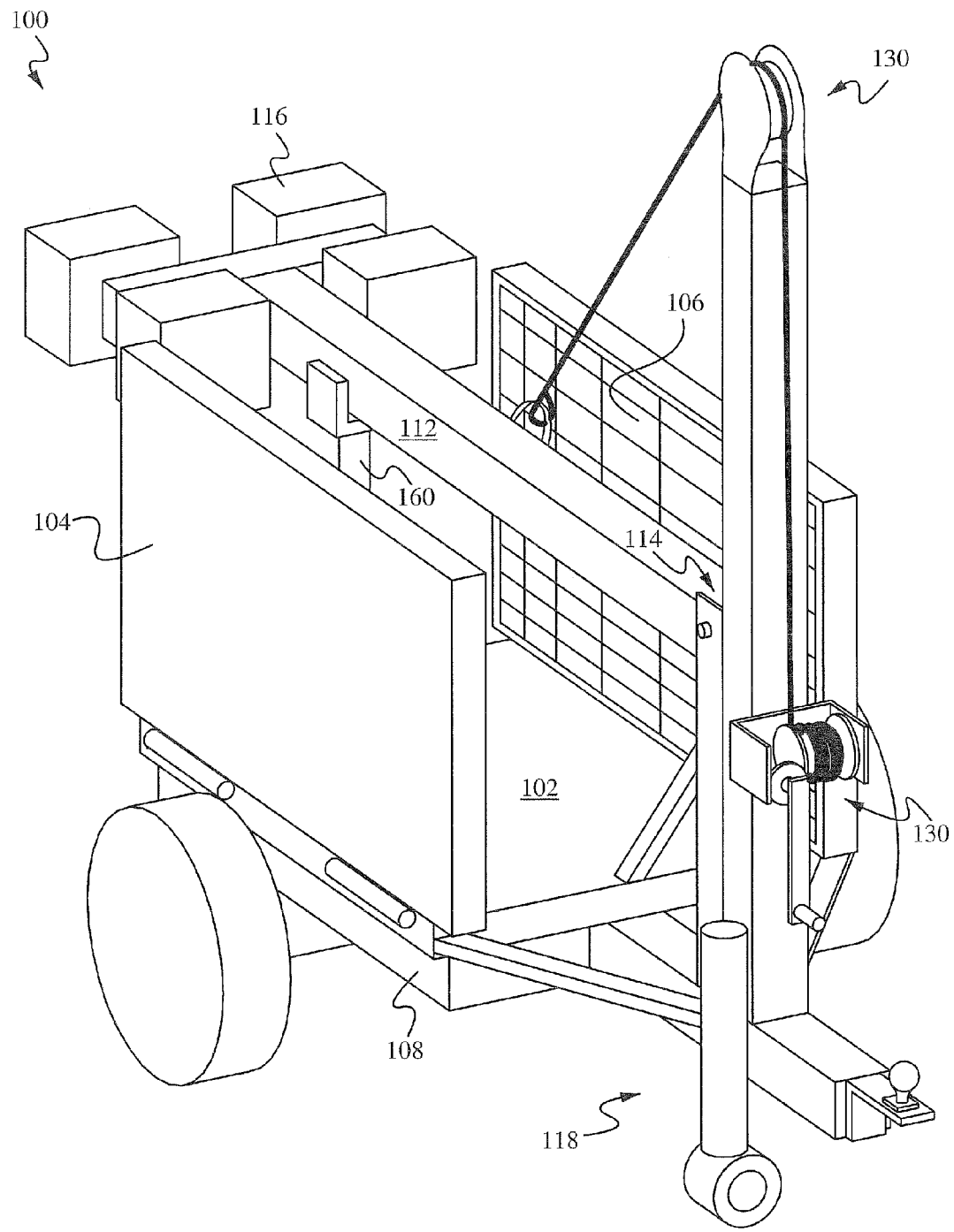
FIG. 6 shows a back perspective view of a portable solar light tower in a travel mode in accordance with some embodiments.
Figure 7:
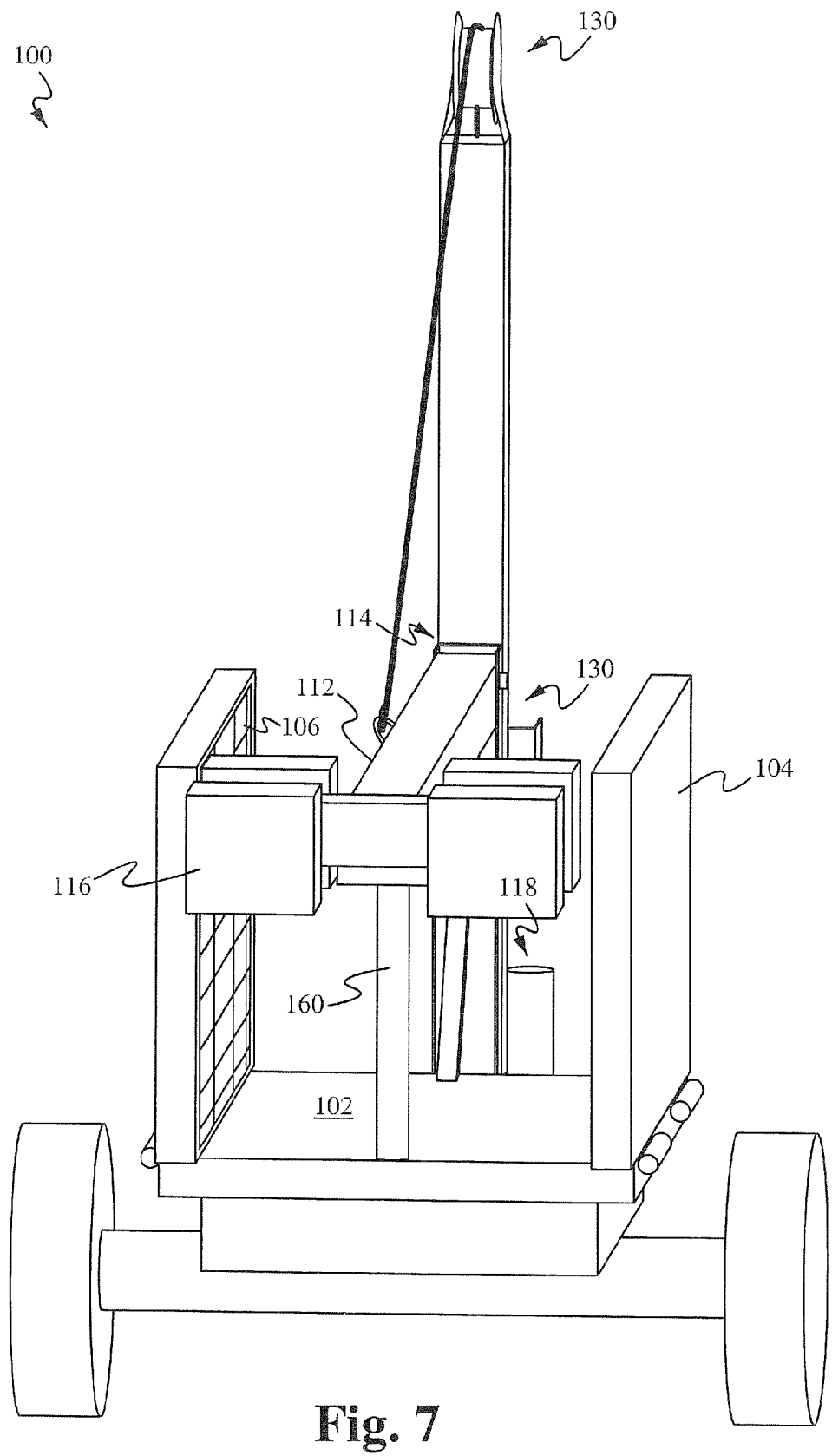
FIG. 7 shows a front perspective view of a portable solar light tower in a travel mode in accordance with some embodiments.

FIG. 6 shows a back perspective view of a portable solar light tower 100 in a travel mode in accordance with some embodiments. FIG. 7 shows a front perspective view of a portable solar light tower 100 in a travel mode in accordance with some embodiments. Referring to FIGS. 6 and 7, as described above, the frame 102 or trailer is the main structure which is able to include typical trailer components such as wheels, tail lights and other features. The backplates 104 protect the solar modules 106 when configured in the closed position or travel mode. The battery box/enclosure 108 is located below the frame and stores the batteries 110 (FIG. 1) for storing the power and powering the lights and possibly other components. The extension tower 112 is coupled to the frame at a base pivot point 114 to allow the lights 116 and the tower 112 to be down in the lowered position as shown for travel mode. The winch/pulley system 130 is able to be used to raise and lower the extension tower 112 and the lights 116. A support 160 is able to support the extension tower 112 and the lights 116.

Figure 8:
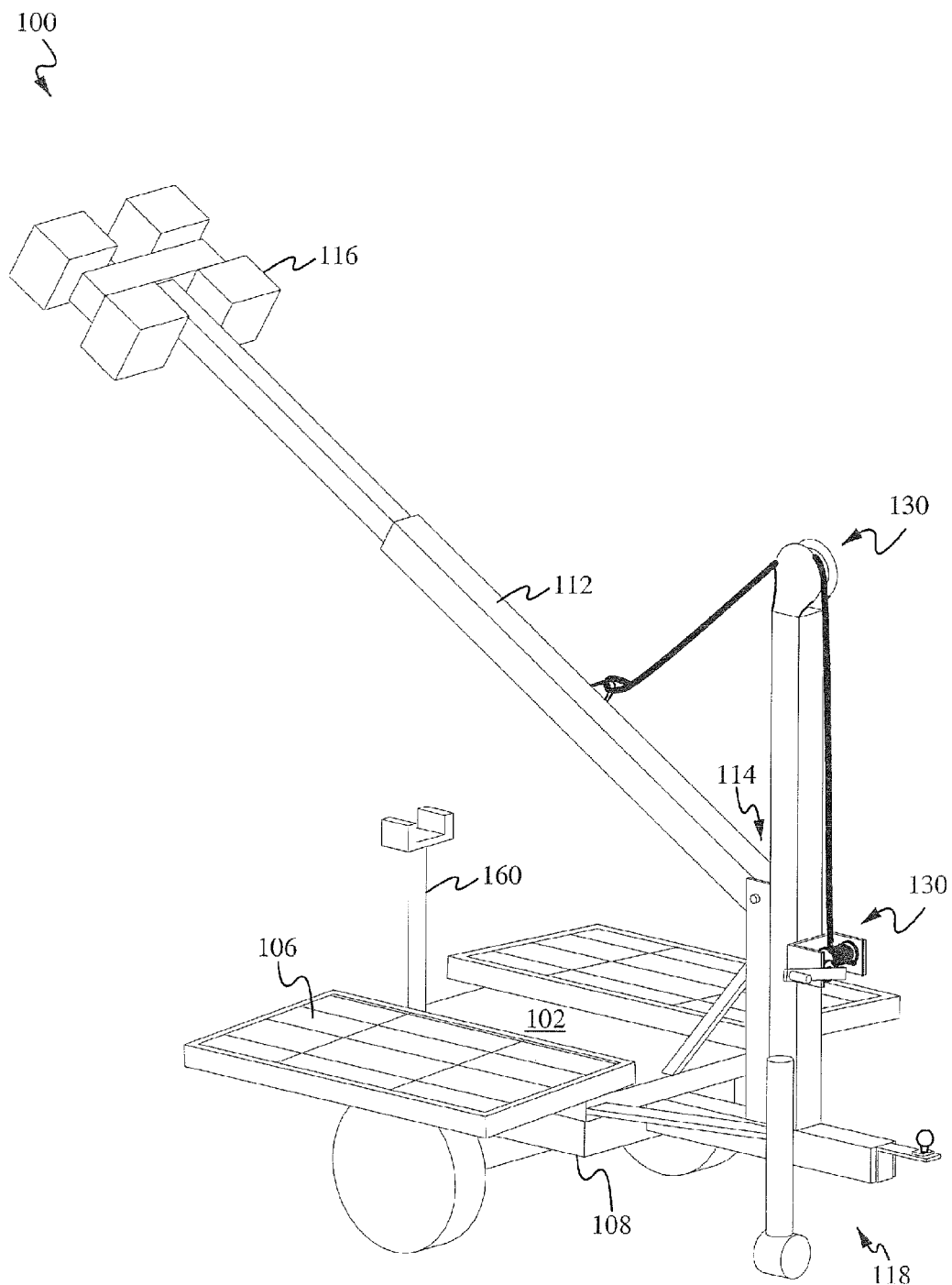
FIG. 8 shows a back perspective view of a portable solar light tower converting from a travel mode to a use and/or charge mode in accordance with some embodiments.

FIG. 8 shows a back perspective view of a portable solar light tower 100 converting from a travel mode to a use and/or charge mode in accordance with some embodiments. As described above, a winch/pulley system 130 or other mechanism is able to be used to raise the extension tower 112 and lights 116. In some embodiments, the solar modules 106 are positioned in an open configuration to receive sunlight and charge the batteries 110, such as by manually moving/pushing/rotating them. In some embodiments, at the same time as the extension tower 112 is raised, the solar modules 106 also fold out and are positioned in an open configuration.

Figure 9:
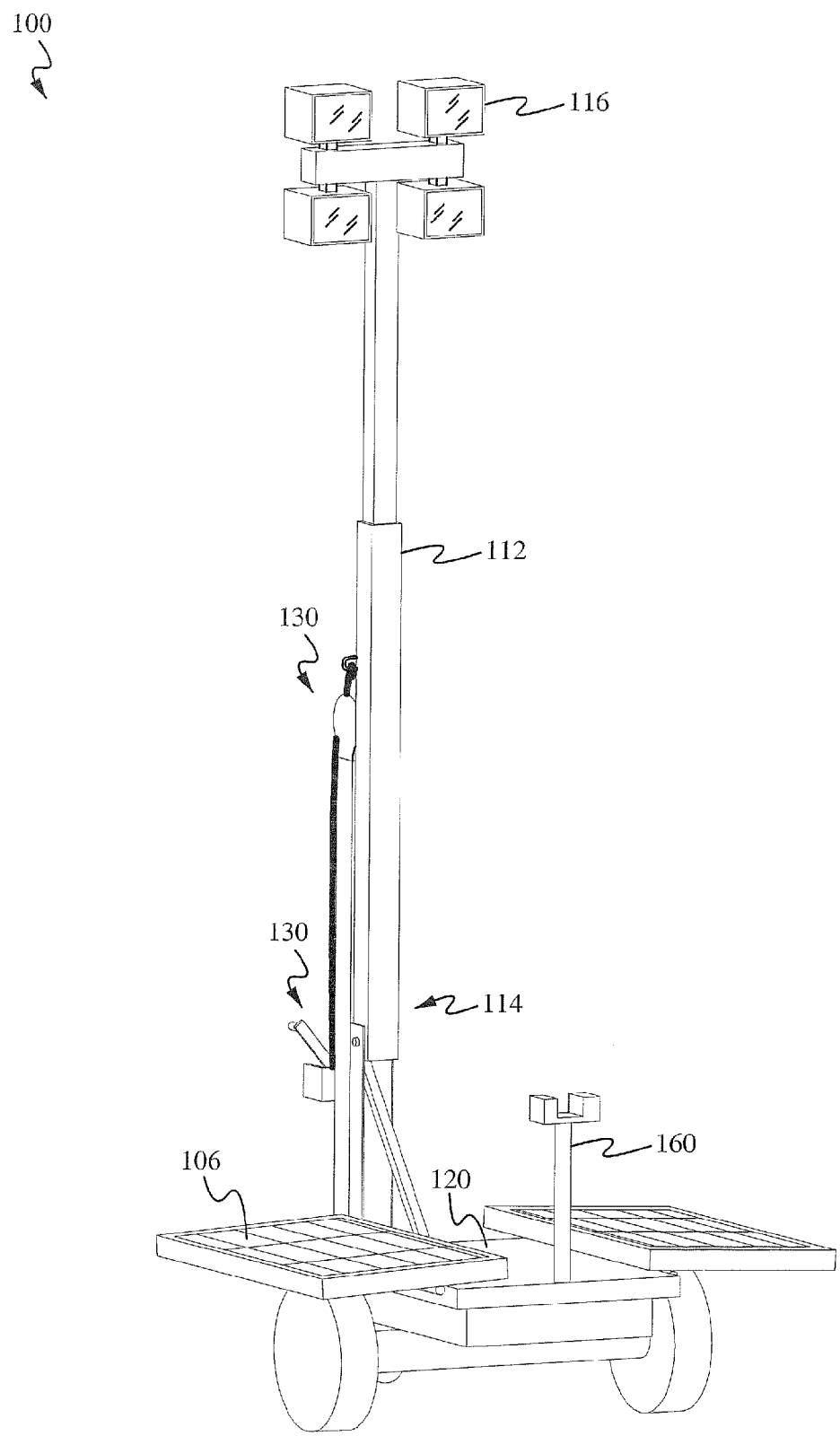
FIG. 9 shows a front perspective view of a portable solar light tower in a use and/or charge mode in accordance with some embodiments.

FIG. 9 shows a front perspective view of a portable solar light tower 100 in a use and/or charge mode in accordance with some embodiments. In use mode, the extension tower 112 and lights 116 are approximately vertical. The specific height and angle of the lights 116 is able to be changed. In charge mode, the solar modules 106 are configured in an open configuration to acquire sunlight. In some embodiments, the configuration of the solar modules 106 is such that the modules 106 are slightly angled so that they receive direct sunlight at different times of the day. In some embodiments, the solar modules 106 are configured to lie flat. In some embodiments, the solar modules 106 are able to manually or automatically move with the sun to maximize the amount of sunlight received. In some embodiments, in use mode, the solar modules 106 are configured in the closed position to protect them at night. In some embodiments, in charge mode, the extension tower 112 and lights 116 are configured in the closed position (also referred to as the lowered or down position) to prevent the portable solar light tower 100 from being an eyesore in the daytime.

There are at least two or three different modes that the portable solar light tower 100 is able to be configured in. In the transport mode, the solar modules 106 are positioned in a closed configuration with the backplates 104 protecting the modules 106. Additionally, the extension tower 112 and lights 116 are positioned in a down position to avoid hitting other objects. In the charge mode, the solar modules 106 are opened to receive sunlight. In the use mode, the extension tower 112 and the lights 116 are positioned in the vertical configuration. The vertical configuration is changeable as desired, such as by moving up and down and angling.

Figure 10:
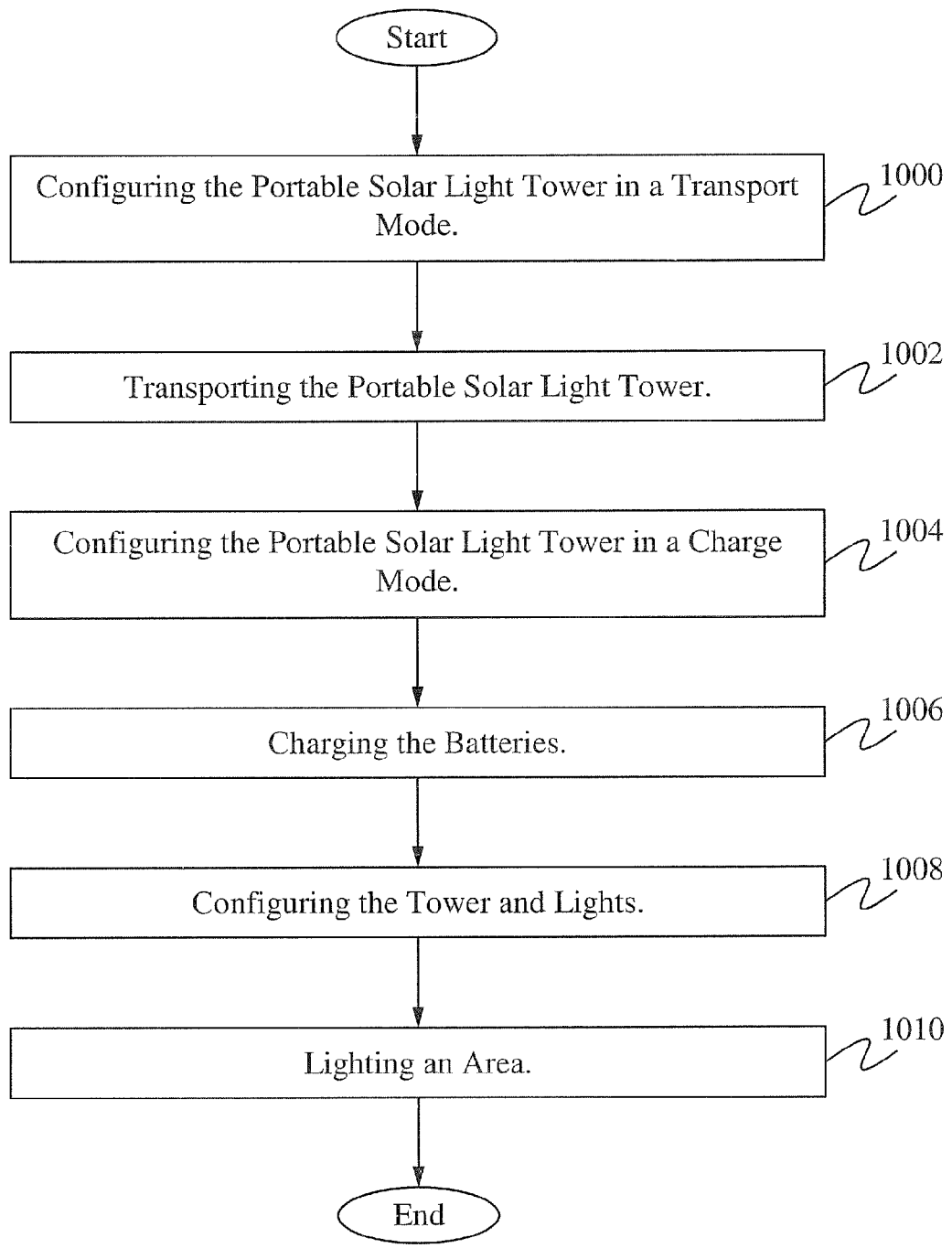
FIG. 10 illustrates a flowchart of a method of utilizing the portable solar light tower in accordance with some embodiments.

FIG. 10 illustrates a flowchart of a method of utilizing the portable solar light tower in accordance with some embodiments. In the step 1000, the user configures the portable solar light tower into a transport mode. To transport the portable solar light tower, the extension tower and lights are configured in a down configuration, and the solar panels are configured in a closed configuration with the protective backplates facing outward. In some embodiments, these configurations are able to be locked into place. If the portable solar light tower is configured in the transport mode, then, in the step 1002, the user is able to transport the portable solar light tower safely without harming other objects or the solar panels. In some embodiments, the portable solar light tower is transported by hooking the trailer up to a vehicle and pulling it similar to any other trailer. If the portable solar light tower is already at its desired location, the steps 1000 and 1002 are able to be skipped. In the step 1004, the portable solar light tower is configured in the charge mode to charge the batteries. To configure the portable solar light tower in the charge mode, the user opens the solar panels into an open configuration so that they are able to acquire sunlight. In the step 1006, the batteries are charged using the solar panels, wind power generate and/or any other power generator. Typically, the batteries are charged during the daytime when the sun is shining. In the step 1008, to use the lights to illuminate an area, the extension tower and the lights are raised and configured to a desired height and angle. In some embodiments, the extension tower and the lights are raised using a winch/pulley system. Then, in the step 1010, using the control system, the lights are turned on. As described, the lights are able to be dimmed, moved and angled into different positions. Typically, the lights are used at nighttime (e.g. for nighttime road construction). When the light is no longer needed, the lights are turned off, and the lights are able to be lowered. In some embodiments, fewer or additional steps are able to be implemented. Additionally, the order of the steps is able to be modified.

In some embodiments, one or more wind turbines are included to further generate power. In some embodiments, the frame is not a trailer and is another shape or form. In some embodiments, the solar light tower is for use at home such as lighting a user's backyard. In some embodiments, the solar light tower is stationary.

To utilize the portable solar light tower, the user first configures the portable solar light tower into the desired mode. To transport the portable solar light tower, the extension tower and lights are configured in a down configuration, and the solar panels are configured in a closed configuration with the protective backplates facing outward. In some embodiments, these configurations are able to be locked into place. The user is then able to transport the portable solar light tower safely without harming other objects or the solar panels. In some embodiments, the portable solar light tower is transported by hooking the trailer up to a vehicle and pulling it similar to any other trailer. To charge the batteries, the user opens the solar panels into an open configuration so that they are able to acquire sunlight. To use the lights to illuminate an area, the extension tower and the lights are raised and configured to a desired height and angle. In some embodiments, the extension tower and the lights are raised using a winch/pulley system. Then, using the control system, the lights are turned on. As described, the lights are able to be dimmed, moved and angled into different positions. When the light is no longer needed, the lights are turned off, and the lights are able to be lowered.

In operation, the portable solar light tower is able to be used to illuminate construction sites and various other lighting needs by providing a self-contained light source for remote locations. The user is able to turn on the lights via dimmer switching, thus controlling the amount of light supplied to the desired area and extending run time. The portable solar light tower is supplied with energy to power the lights via batteries which are charged by solar panels. The light tower includes a telescoping arm that is able to be extended when a larger footprint of light is desired. When the user wants to relocate the portable solar light tower, the tower collapses easily, the solar panels fold up into a protective mode and the portable solar light tower is able to be pulled like a trailer. Since the portable solar light tower uses solar power instead of diesel fuel it is able to save a user money. Users do not need to worry about the cost of oil rising as it will not affect the cost of powering the portable solar light tower. Unlike an extremely loud diesel generator, the portable solar light tower is very quiet. Furthermore, the portable solar light tower does not generate any potentially harmful emissions.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

We claim:

1. A solar power device, comprising:
   a. a substantially horizontal portable base plate, wherein the portable base plate is part of a trailer;
   b. a first solar panel coupled to a first side of the portable base plate for converting solar energy into electricity;
   c. a second solar panel coupled to a second side of the portable base plate opposite the first side for converting solar energy into electricity; and
   d. a light coupled to the portable base plate for illuminating an area using the electricity from the solar panel
   wherein the first solar panel and the second solar panel are positioned in a substantially vertical orientation above the portable base plate in a closed position and are rotatable to a substantially horizontal orientation in an open position by opening outward from the closed position, wherein the first solar panel and the second solar panel each face inward toward the trailer when positioned in the closed position, wherein the first solar panel and the second solar panel fold out over fenders of the trailer.

2. The device of claim 1 further comprising a first protective back plate for protecting the first solar panel and a second protective back plate for protecting the second solar panel.

3. The device of claim 1 further comprising a battery for storing the electricity and providing the electricity to the light.

4. The device of claim 1 further comprising a control panel for controlling the light and the solar panel.

5. The device of claim 1 further comprising a pivotable, telescoping tower coupling the light to the portable base plate, wherein the telescoping tower is extendable and pivotable between a down position to an up position.

6. The device of claim 5 further comprising a winch and pulley system for moving the telescoping tower between the down position to the up position.

7. The device of claim 1 further comprising anti-slam shock absorbers coupled to the portable base plate for preventing the solar panel from slamming open.

8. The device of claim 1 wherein the first solar panel and the second solar panel are each rotatable to the open position to acquire the solar energy and the closed position to protect the solar panels.

9. The device of claim 1 wherein the light is selected from the group consisting of one or more floodlights and one or more light emitting diode floodlights.

10. A solar powered battery operated portable light tower, comprising:
    a. a frame of a trailer;
    b. a first enclosure supported by the frame, the enclosure including one or more batteries;
    c. a second enclosure containing controls;
    d. an extension tower including a set of light emitting diode floodlights;
    e. a cable winch and pulley system to extend and contract the tower;
    f. a first solar panel;
    g. a second solar panel;
    h. a first rotatable back plate; and
    i. a second rotatable back plate, wherein the first solar panel remains substantially in contact with the first rotatable back plate, and the second solar panel remains substantially in contact with the second rotatable back plate while in an open position and a closed position, wherein the first solar panel and the second solar panel face inward toward the trailer when positioned in the closed position, further wherein the first solar panel and the second solar panel are positioned in a vertical orientation when positioned in the closed position, wherein the first solar panel and the second solar panel fold out over fenders of the trailer.

11. The light tower of claim 10 wherein the controls comprise a control panel for controlling the set of light emitting diode floodlights and the first solar panel and the second solar panel.

12. The light tower of claim 10 wherein the tower comprises a pivotable, telescoping tower coupling the floodlights to the frame, wherein the telescoping tower is extendable and pivotable between a down position to an up position.

13. The light tower of claim 10 wherein the first solar panel and the second solar panel are each rotatable to the open position to acquire the solar energy and the closed position to protect the solar panels.

14. A method of utilizing a portable solar light tower comprising:
    a. configuring a portable solar light tower on a trailer in a transport mode including placing a first solar panel and a second solar panel in a protected position by rotating the first solar panel and the second solar panel from a substantially horizontal position to a substantially vertical position with the first solar panel and the second solar panel each facing inward toward the trailer, with a back plate covering each of the first solar panel and the second solar panel wherein each back plate is separate from the first solar panel and the second solar panel, wherein the first solar panel and the second solar panel fold out over fenders of the trailer;
    b. transporting the portable solar light tower;
    c. configuring the portable solar light tower in a charge mode including placing the first solar panel and the second solar panel in a position to receive sunlight and lowering an extension tower and lights to a down position;
    d. charging a battery using the first solar panel and the second solar panel of the portable solar light tower;
    e. configuring the portable solar light tower in a light mode including raising the extension tower into a substantially upright position and placing the first solar panel and the second solar panel in the protected position by rotating the first solar panel and the second solar panel in the substantially vertical position with the back plate covering each of the first solar panel and the second solar panel; and
    f. lighting an area.

15. The method of claim 14 wherein configuring the portable solar light tower in the transport mode includes placing the extension tower in a down position.

16. The method of claim 14 wherein transporting includes trailering the portable solar light tower.

17. A system for illuminating an area at night using a renewable energy source comprising:
    a. an energy acquisition component for acquiring energy from the renewable energy resource, wherein the energy acquisition component comprises a front side, a back side, a top side, a bottom side, a left side and a right side;
    b. a protective component including a backplate rotatable from a substantially horizontal position to a substantially vertical position for protecting the energy acquisition component, wherein the backplate is coupled to a trailer, wherein the energy acquisition component faces inward toward the trailer when in the substantially vertical position, wherein the energy acquisition component folds out over a fender of the trailer, wherein the protective component covers the back side, the top side, the bottom side, the left side and the right side of the energy acquisition component, wherein the protective component is separate from the energy acquisition component;

c. a lighting component for illuminating the area; and d. a raising component for raising the lighting component.

18. The system of claim 17 further comprising a transporting component for transporting the system.

19. The system of claim 18 wherein the transporting component is the trailer.

20. The system of claim 17 further comprising a battery for storing the electricity and providing the electricity to the light.

21. The system of claim 17 further comprising a control component for controlling the lighting component and the energy acquisition component.

22. The system of claim 17 wherein the raising component comprises a pivotable, telescoping tower coupling the lighting component to the transporting component, wherein the telescoping tower is extendable and pivotable between a down position to an up position.

23. The system of claim 17 wherein the raising component comprises a winch and pulley system for moving the telescoping tower between the down position to the up position.

24. The system of claim 17 wherein the protective component further comprises anti-slam shock absorbers for preventing the energy acquisition component from slamming open.

25. The system of claim 17 wherein the energy acquisition component is rotatable to an open position to acquire solar energy and a closed position to protect the energy acquisition component.

26. The system of claim 17 wherein the light is selected from the group consisting of one or more floodlights and one or more light emitting diode floodlights.

27. A portable system for illuminating an area at night using a renewable energy source comprising:

a. a trailer base with wheels;

b. a plurality of energy acquisition components for acquiring energy from the renewable energy resource, wherein each energy acquisition component comprises a front side, a back side, a top side, a bottom side, a left side and a right side;

c. a protective component including a backplate rotatable from a substantially horizontal position to a vertical position with each energy acquisition component facing inward toward the trailer base for protecting each energy acquisition component, wherein the protective component covers the back side, the top side, the bottom side, the left side and the right side of each energy acquisition component, further wherein the backplate comprises a tubular framework which couples to the trailer base via a pivotal shaft at a pivot point enabling each energy acquisition component to fold out over fenders of the trailer base;

d. a lighting component for illuminating the area; and e. a raising component coupled to the trailer base for lowering and raising the lighting component before and after transport.

\* \* \* \* \*